United States Patent [19]

Menke et al.

[11] Patent Number: 5,539,712

[45] Date of Patent: *Jul. 23, 1996

[54] LIFTING AND LOWERING DEVICE FOR A RECORD PLAYBACK UNIT IN A RECORD PLAYING DEVICE

[75] Inventors: Wilhelm Menke, Bingen; Ullrich Schulze, Wiesbaden; Horst Niederlein; Boerge Heidersberger, both of Bingen, all of Germany

[73] Assignee: NSM Aktiengesellschaft, Bingen, Germany

[*] Notice: the term of this patent shall not extend beyond the expiration date of Pat. No. 5,228,016.

[21] Appl. No.: 244,317

[22] PCT Filed: Dec. 4, 1992

[86] PCT No.: PCT/DE92/01023

§ 371 Date: Jul. 1, 1994

§ 102(e) Date: Jul. 1, 1994

[87] PCT Pub. No.: WO93/11535

PCT Pub. Date: Jun. 10, 1993

Related U.S. Application Data

[63] Continuation-in-part of Ser. No. 684,886, Oct. 17, 1989, Pat. No. 5,228,016.

[30] Foreign Application Priority Data

Dec. 6, 1991 [DE] Germany ............... 41 40 234.0

[51] Int. Cl.[6] ................................................. G11B 17/22
[52] U.S. Cl. .................................. 369/36; 369/36
[58] Field of Search .......................... 369/36, 34, 265, 369/36; 360/98.08

[56] References Cited

U.S. PATENT DOCUMENTS

| 4,425,638 | 1/1984 | Suzuki et al. | 369/36 |
|---|---|---|---|
| 4,575,836 | 3/1986 | Seto | 369/265 |
| 4,614,474 | 9/1986 | Sudo | 414/281 |
| 4,742,504 | 5/1988 | Takasuka et al. | 369/36 |
| 4,783,777 | 11/1988 | Camerik | 369/265 |
| 4,815,056 | 3/1989 | Toi et al. | 369/36 |
| 4,817,070 | 3/1989 | Hug et al. | 369/36 |
| 4,827,463 | 5/1989 | Motoyoshi et al. | 369/36 |
| 4,841,499 | 7/1989 | Takahashi et al. | 369/38 |
| 4,853,916 | 8/1989 | Tomita | 369/36 |
| 4,903,252 | 2/1990 | Tanaka et al. | 369/36 |
| 4,912,575 | 3/1990 | Shiosaki | 360/71 |

(List continued on next page.)

FOREIGN PATENT DOCUMENTS

| 0138005 | 4/1985 | European Pat. Off. . |
| 0183856 | 6/1986 | European Pat. Off. . |
| 0427531 | 5/1991 | European Pat. Off. . |
| 2164781 | 3/1986 | United Kingdom . |
| 90/04845 | 5/1990 | WIPO . |

OTHER PUBLICATIONS

Butturini R.: "Performance Simulation Of A High Capacity Optical Disk System"; Digest of papers ninth IEEE Symposium on Mass Storage Systems. Nov. 3, 1988, pp. 147–153.

*Primary Examiner*—Stuart S. Levy
*Assistant Examiner*—Adriana Giordana
*Attorney, Agent, or Firm*—Spencer & Frank

[57] ABSTRACT

A record playing device includes a record magazine that contains record holders with records located in superimposed storage compartments. A record playback unit is located adjacent the record magazine and a travelling transport device conveys a desired record with the record holder back and forth between a selected storage compartment and the playback unit. A lifting and lowering device is disposed above the playback unit and includes a vertically extending guide rod and a holding mechanism seated to glide on the guide rod. A bracket is fixed to the holding mechanism and includes a record hold-down element for receiving a record holder with a record. A motor-driven eccentric control is coupled to the holding mechanism for lowering and lifting the holding mechanism together with the bracket along the guide rod.

6 Claims, 6 Drawing Sheets

U.S. PATENT DOCUMENTS

| | | | |
|---|---|---|---|
| 4,954,918 | 9/1990 | Shiosaki | 360/98.06 |
| 5,001,582 | 3/1991 | Numasaki | 360/98.06 |
| 5,022,019 | 6/1991 | Motoyoshi et al. | 369/36 |
| 5,033,038 | 7/1991 | Kobayashi et al. | 369/36 |
| 5,036,503 | 7/1991 | Tomita | 369/36 |
| 5,150,341 | 9/1992 | Shibayama | 369/36 |
| 5,220,548 | 6/1993 | Nakatsukasa et al. | 369/36 |
| 5,228,016 | 7/1993 | Menke | 369/36 |
| 5,253,234 | 10/1993 | Ogawa et al. | 369/36 |
| 5,267,225 | 11/1993 | Fukasawa et al. | 369/36 |
| 5,282,183 | 1/1994 | Arifku et al. | 369/36 |
| 5,289,441 | 2/1994 | Domberg et al. | 369/34 |
| 5,293,284 | 3/1994 | Sato et al. | 360/92 |
| 5,319,621 | 6/1994 | Amar | 369/34 |
| 5,331,614 | 7/1994 | Ogawa et al. | 369/34 |
| 5,353,269 | 10/1994 | Kobayashi et al. | 369/36 |
| 5,373,489 | 12/1994 | Sato et al. | 369/36 |

LIFTING AND LOWERING DEVICE FOR A RECORD PLAYBACK UNIT IN A RECORD PLAYING DEVICE

CROSS REFERENCE TO RELATED APPLICATIONS

This is a continuation-in-part of U.S. patent application No. 684,886 filed Oct. 17, 1989, now U.S. Pat. No. 5,228,016.

BACKGROUND OF THE INVENTION

The invention relates to a record playing device having two record magazines located opposite one another that contain record holders with records located in superimposed storage compartments, and having a traveling transport device to convey a desired record with the associated record holder back and forth between the storage compartment and a playback unit.

A record playing device of this type is known from DE 3,922,721.A1. In this case the record magazines, which each have a plurality of superimposed storage compartments for storing a corresponding number of record holders that each receive one record, are disposed laterally and opposite one another in a housing. A transport device that travels up and down to convey a desired record with the associated record holder back and forth between the storage compartment and a playback unit is located in the space between the record magazines. The transport device has two pull-out devices for the record holders which can be controlled independently of one another and that travel horizontally on the transport device. The playback unit is stationarily mounted between and beneath the two record magazines opposite one another. Either the two pull-out devices of the transport device are located in a ready position for pulling out a record holder for a record disposed in the associated record magazine, or the one pull-out device has traveled into a central position in which it fixes the record with the record holder, the record having been removed from the associated record magazine, concentrically to the record turntable of the playback unit, while the other pull-out device remains in its ready position for the other record magazine.

In order to permit a temporally immediate, consecutive playback of records, as is required in discotheques, in this known record playing device, a plurality of playback units having respectively associated transport devices are disposed in series one behind the other, with the interposition of a record holder that is open on both sides and accessible by means of adjacent transport devices, with a further record magazine provided at each end of the series. This is disadvantageous in that a separate transport device is associated with each playback unit, which requires increased space. Furthermore, the records can always only be returned to the same record magazine after playback.

SUMMARY OF THE INVENTION

The object of the invention is to create a record playing device of the type mentioned at the outset which, in a simple and compact design, permits the next selected record to be readied before the end of playback of the previously selected record, and in which the records can be removed from and returned to the record magazine in the desired order.

This object is attained in accordance with the invention in that at least two playback units are provided that can be serviced by the transport device and controlled independently of one another, and the individual record with the record holder can selectively be transported from the one to the other record magazine to the one or the other playback unit and, after playback, be replaced, again selectively, in the one or the other record magazine by means of the transport device.

The result of these measures is a record playing device of relatively small size which, while a record taken from one of the two record magazines is played back on a playback unit, permits the next record selected from one of the record magazines to be readied on the other playback unit, so that the records can be played back in immediate succession, i.e. without a pause. Moreover, the option exists that is to be used particularly in regard to the selection of pieces of music during playback of slowly fading out the last seconds of the record being played back and blending it with the first seconds of the next record to be played, which is correspondingly slowly faded in. The effect achieved in doing this corresponds to the effect which results when pieces of music are blended together in discotheques. Hence, a so-called disco atmosphere can be created by means of the record playing device. Moreover, due to the presence of two record playing devices, two different pieces of music can be offered simultaneously in two different rooms, for example normal jukebox operation in the one room and background music in the other room.

In accordance with an advantageous embodiment of the invention, the individual records with the respectively associated record holder can be exchanged directly between the record magazines with the aid of the transport device. This results in the option of automatically combining groups of records of a specific musical style, for example folk music, in the record magazines.

In an advantageous embodiment of the subject of the invention, at least one playback unit is disposed beneath and/or above each record magazine. This results in a particularly compact playback device.

To attain a short conveyor path for the records, in an alternative embodiment of the invention, a playback unit is disposed respectively beneath one of the record magazines and above the transport device. As an alternative, it is also possible to dispose two superimposed playback units beneath one of the record magazines. The records can thereby be placed onto the playback units in the same direction of their horizontal movement.

So that, for example, the disco effect can be achieved in one room by overlapping pieces of music and background music can be offered in another room, in a further advantageous embodiment of the invention a playback unit is disposed above each record magazine and beneath the transport device.

So that playback and storage of an individual record not present in a record magazine can be performed in a simple manner in a record magazine without corresponding exchanging, in accordance with a further advantageous modification of the subject of the invention, at least one of the record magazines is allocated an insertion compartment that receives a record holder with a record in such a manner that, in the inserted state of the insertion compartment, the record holder can be conveyed with the record to one of the playback units or to a free storage compartment of one of the record magazines by means of the transport device, and the record can be exchanged manually in the pulled-out state of the insertion compartment. Accordingly, a record not present in a record magazine can be played back individually and possibly stored subsequently in one of the record magazines.

An insertion compartment is advisably provided beneath or above each record magazine.

Furthermore, in a record playing device in which the transport device, which can move in the stacking direction of the record magazines, encompasses two horizontally traveling pull-out devices for the horizontal movements of a record holder with a record, these devices being controllable independently of one another, it is preferably provided that the transport device is allocated a lifting and lowering device for further conducting the record holder with the record to and from the playback unit and disposed above each playback unit disposed in the vertical axis of the record magazine. The result is an overall structurally simple design of the transport device.

So that the record is precisely positioned on the record turntable of the playback unit during playback, in accordance with an advantageous embodiment of the invention, during its downward movement beyond the associated playback unit into its end position, the lifting and lowering device that receives a record holder with a record places the record onto the record turntable while lifting it from the record holder, and clamps it with the record turntable by means of a record hold-down element stationarily disposed on the lifting and lowering device.

To realize a structurally simple drive for the lifting and lowering device, in accordance with a further advantageous embodiment of the invention the lifting and lowering device can be moved up and down by way of a motor-driven eccentric gear control. The lifting and lowering device advisably has a bracket that receives the record holder with the record, supports the record hold-down element oriented with the axis of the record turntable and is seated to glide via a holding mechanism on a vertically extending guide rod. A drive motor secured to the holding mechanism is preferably coupled with the eccentric seated on the shaft of the worm gear, the eccentric being supported against a stationary roller in such a way that the upper and lower end positions of the lifting and lowering device are determined by this roller.

For the purpose of monitoring the movement of the lifting and lowering device, in one embodiment of the invention two superimposed fork couplers that cooperate with a corresponding, stationarily disposed web are secured to the holding mechanism in order to recognize the upper and lower end position of the lifting and lowering device. Furthermore, a sensor is advisably disposed on the holding mechanism to monitor the exact orientation of the record stored in the record holder in relation to the record turntable of the playback unit.

BRIEF DESCRIPTION OF THE DRAWINGS

The concept underlying the invention is described in detail below by way of a plurality of embodiments illustrated in the drawing figures. Shown are in.

DETAILED DESCRIPTION OF THE PREFERRED EMBODIMENTS

Figure 1:
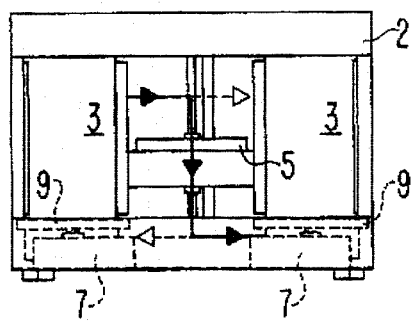
FIG. 1 a front view of a record playing device according to the invention, having indicated, possible conveyor paths of a record taken from a record magazine, FIG. 2 an alternative embodiment of the record playing device according to FIG. 1, FIG. 3 a further alternative embodiment of the record playing device according to FIG. 1, FIG. 4 a further alternative embodiment of the record playing device according to FIG. 1, FIG. 5 a further alternative embodiment of the record playing device according to FIG. 1, FIG. 6 an enlarged, detailed representation of the record playing device according to FIG. 1, FIG. 7 a cross-section through the record playing device according to FIG. 6, FIG. 8 an enlarged section of the side view of the record playing device according to FIG. 6 in the direction of arrow VIII, FIG. 9 an enlarged representation of the lifting and lowering device associated with the right playback unit of the record playing device according to FIG. 6, and FIG. 10 an enlarged representation of the lifting and lowering device associated with the left playback unit of the record playing device.

The record playing device, by means of which information stored on records 1, particularly musical selections, can be visually read out and played back, comprises a housing 2 that has an operating panel, not seen, which has different keys connected to a central control unit, for example a record selection key, a record playback key and a stop key. Record magazines 3 opposite one another are disposed laterally in the housing 2. The record magazines 3 are designed to be identical to one another, and each possesses a number of superimposed storage compartments for storing a corresponding number of record holders 4, each of which receives a record 1. A transport device 5 for the record holder 4 that receives a record 1, which transport device travels up and down, is located in the space between the record magazines 3. The transport device 5 has two pull-out devices 6 for the record holders 4 which can be controlled independently of one another and travel horizontally on the transport device. These pull-out devices 6 can be controlled such that a record holder 4 can be conveyed with a record 1 from a record magazine 3 into an empty storage compartment of the other record magazine 3. If, for example, a record 1 from the left record magazine 3 is to be placed in the right record magazine 3, first the left pull-out device, in the ready position with respect to the left record magazine 3, engages the corresponding record holder 4 with the record 1 and then conveys the record holder 4 into a central position on the transport device 5, in which position it re-releases the record holder. Then the transport device 5 travels again to the free storage compartment of the right record magazine 3. Simultaneously, or possibly subsequently, the other pull-out device 6 travels out of its ready position with respect to the right record magazine 3 into its left end position on the transport device 5, and here engages the record holder 4 and conveys it into the storage compartment of the right record magazine while returning to the ready position. Subsequently, the transport device 5 returns to its initial position.

Figure 6:
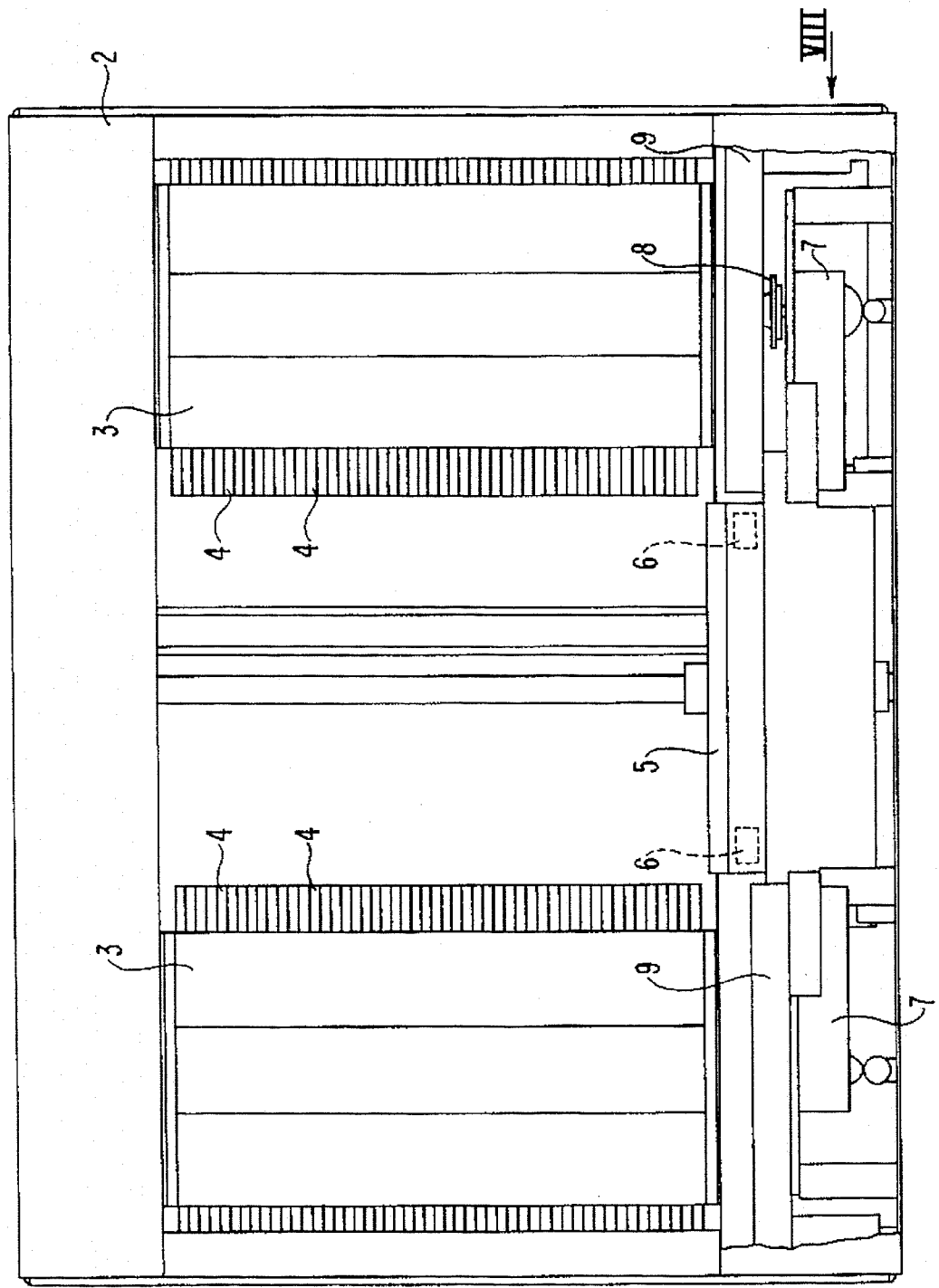
Figure 7:
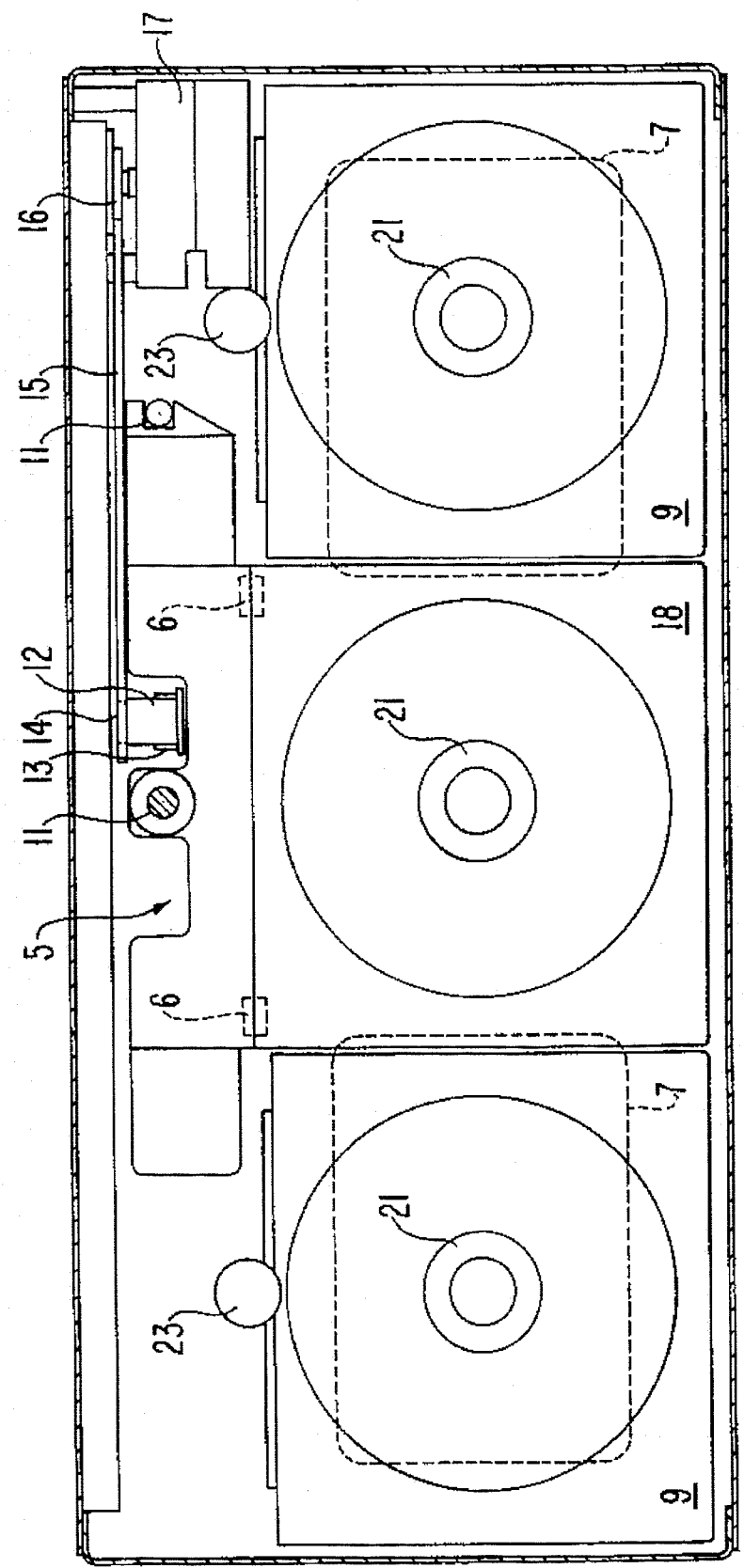
Figure 8:
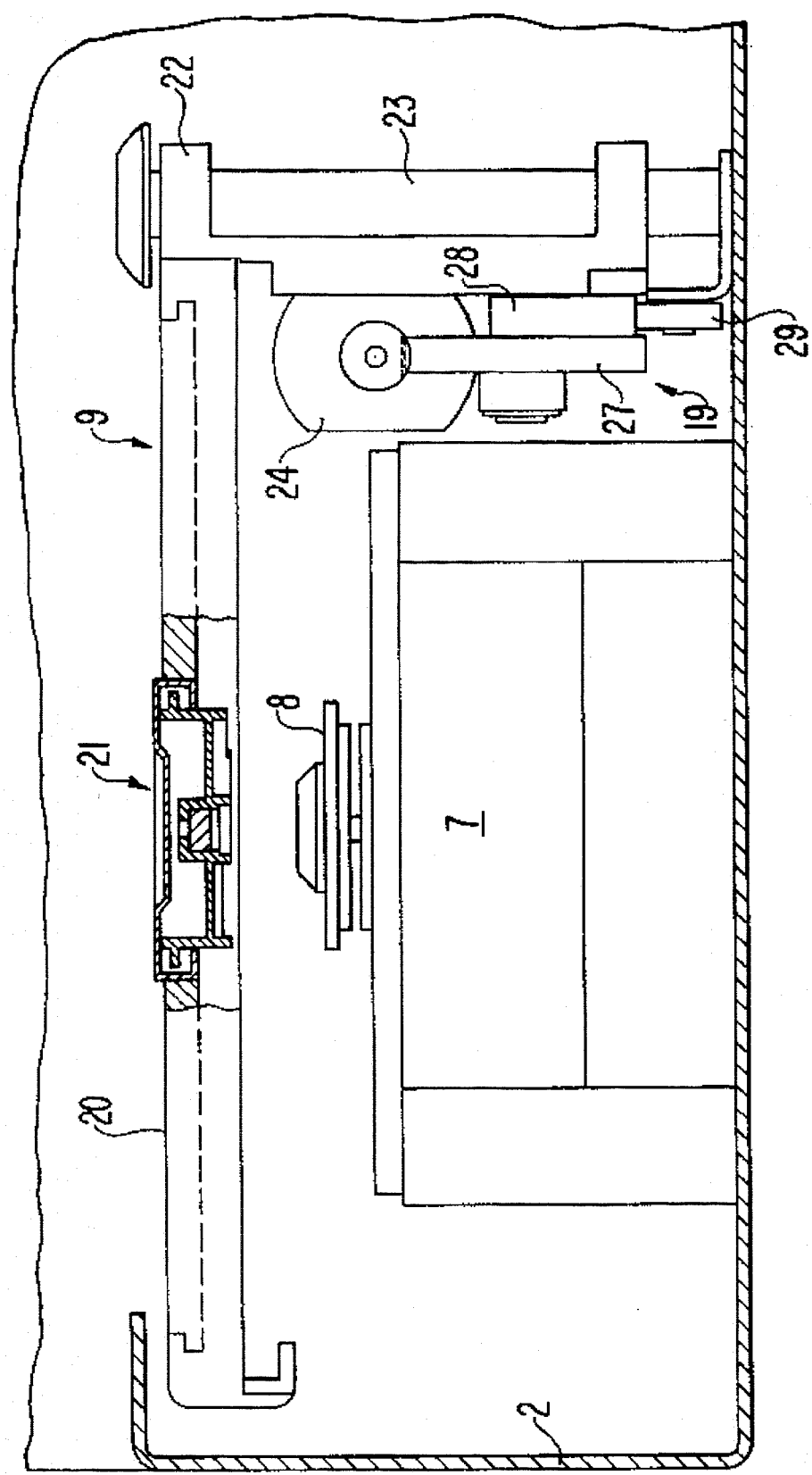
Figure 9:
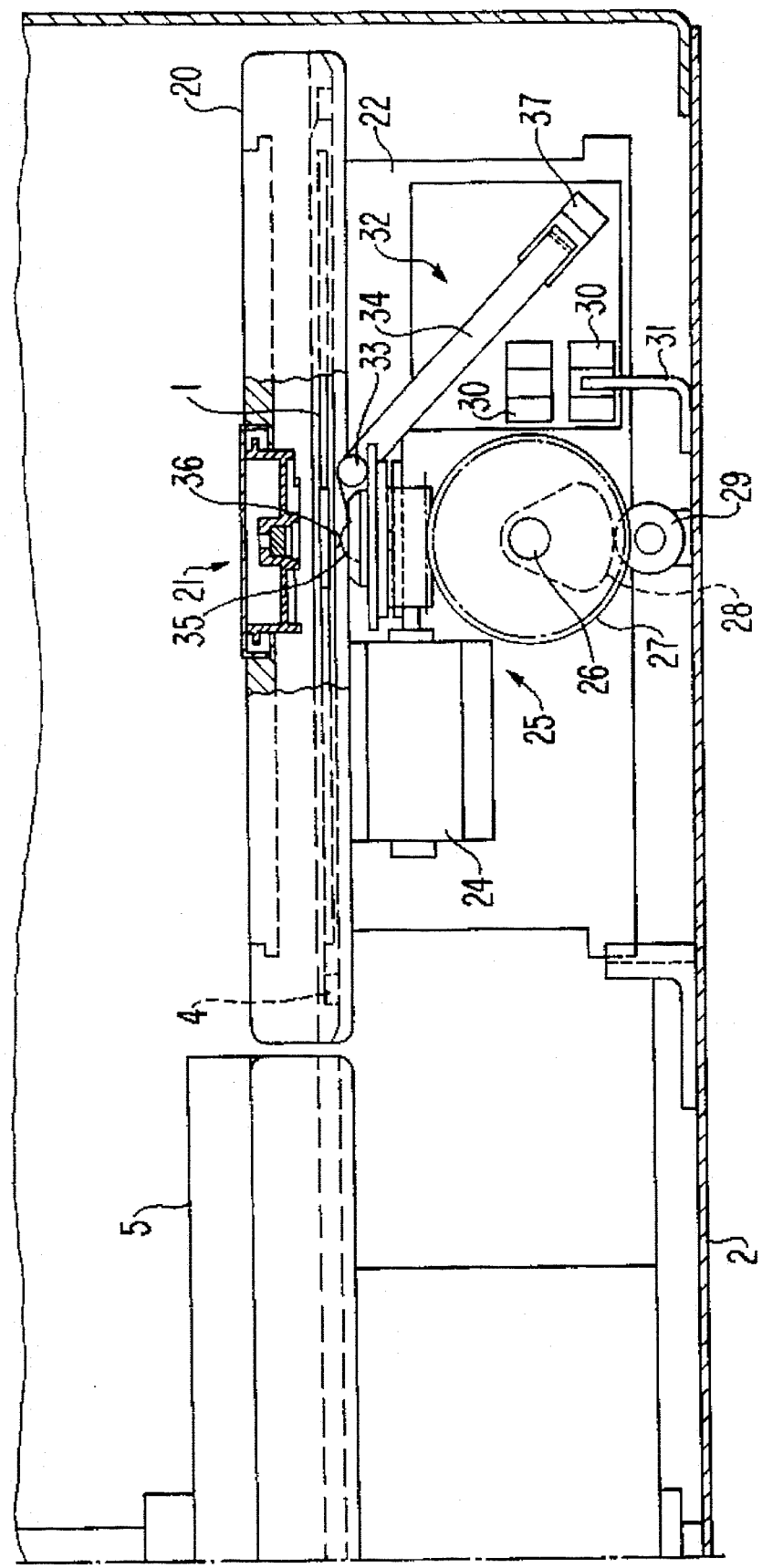
Figure 10:
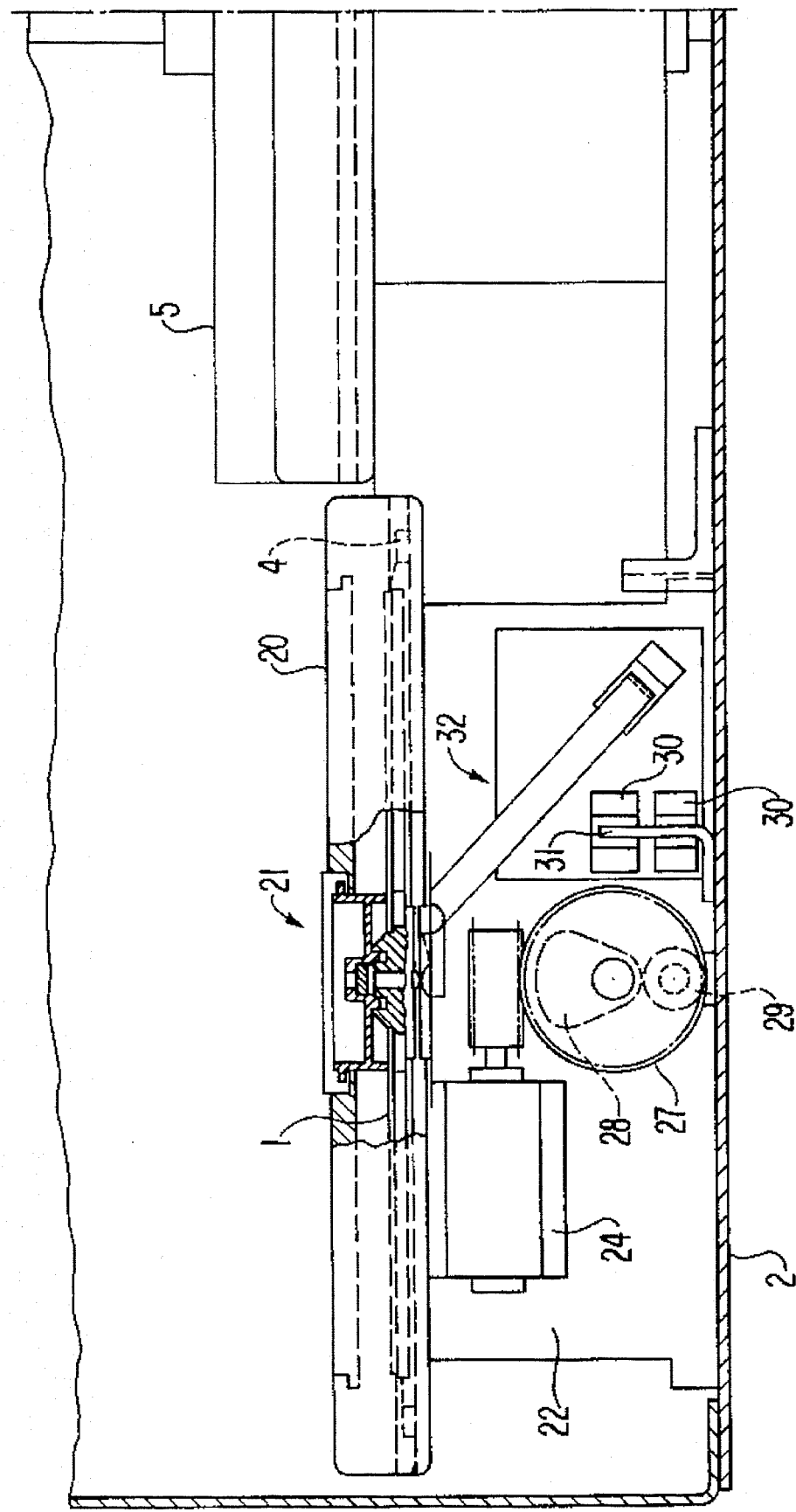

In the record playing device according to FIGS. 1 and 6, a playback unit 7 that has a record turntable 8 is disposed beneath the two record magazines 3 opposite one another, and is serviced by the transport unit 5 with the interposition of a lifting and lowering device 9 respectively disposed above the playback units 7. In this connection, for example a record 1 can be conveyed with the associated record holder 4 onto the transport device 5 by means of the left pull-out device 6 located in the ready position. Subsequently the transport device 5 travels to the transfer height of the left lifting and lowering device 9 located in the upper end position. Then the record 1 is transferred with the record holder 4 by means of the pull-out device 6 into the lifting and lowering device 9, which thereupon places the record 1 onto the record turntable 8 of the lifting and lowering device 9 while executing a corresponding downward movement. During playback of this record 1, a further record 1 can already be taken out of the left record magazine with the associated record holder 3 and can be placed onto the record turntable 8 of the right playback unit 7 by means of corresponding actuation of the pull-out devices 6 and the travel paths of the transport device 5 and the lifting and lowering device 9. This makes possible an immediate, consecutive playback of the records, possibly with overlap of the pieces of music. After playback, the records are returned to the left record magazine 3 during the reversal of the forenamed movements. Of course, in corresponding actuation, a record from the right or left record magazine 3 can be played back on the right or left playback unit 7.

Figure 3:
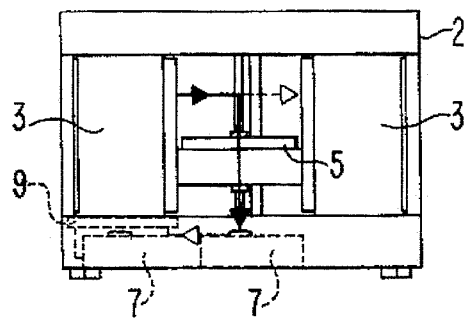
Figure 2:
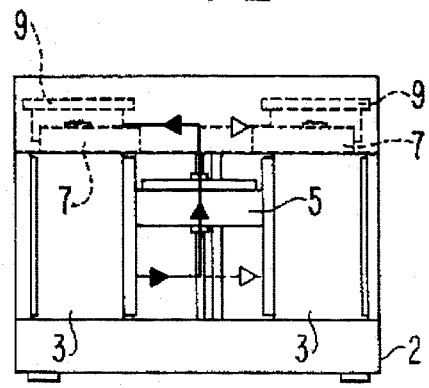
Figure 4:
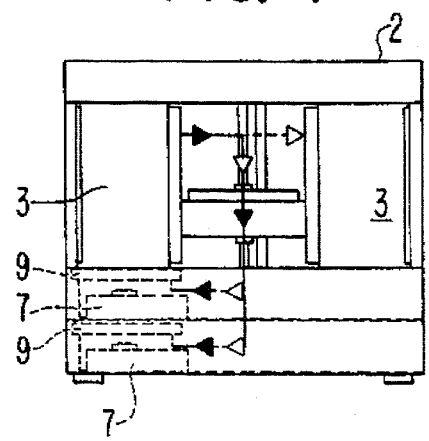
Figure 5:
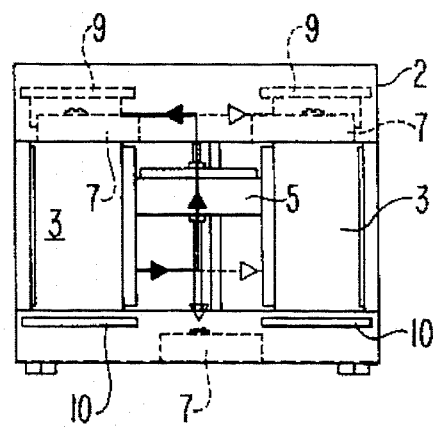

In the embodiment of the record playing device shown in FIG. 2, the two playback units 7 are disposed, with the associated lifting and lowering units 9, above the record magazines 3, while in the embodiment of the record playing device according to FIG. 3, the one playback unit 7 is disposed, with an associated lifting and lowering device 9, beneath the left record magazine 3 and the other playback unit 7 is disposed directly beneath the transport device 5, and the individual record can be positioned on this playback unit 7 without the interposition of a lifting and lowering device 9. In the record playing device illustrated in FIG. 4, two playback units 7, each having an associated lifting and lowering device 9, are located beneath the left record magazine 3. The record playing device shown in FIG. 5 has two playback units 7 that have associated lifting and lowering devices 9 and are located above the record magazines 3, and a playback unit 7 disposed directly beneath the transport device 5. In this case, an insertion compartment 10 is provided beneath each record magazine 3. The individual insertion compartment 10 receives a record holder 4 provided with a record 1 and that can be engaged by the transport device 5. For this purpose the record holder 4 protrudes laterally beyond the insertion compartment 10. In the pulled-out state of the insertion compartment 10, the record 1 can be easily exchanged by hand.

Two guide rods 11, which extend parallel to one another and vertically, and on which the transport device 5 is seated to glide, are located on the rear side of the housing 2. The guide rod 11 disposed centrally with respect to the housing 2 is allocated a toothed belt 13 that extends parallel thereto and is guided by way of deflection rollers 12, and is connected to the transport device 5 by way of a clamp-type holder. The lower deflection roller 12 for the toothed belt 13 is coupled with a further deflection roller 14 for a toothed belt 15, which is connected to the driving wheel 16 of a driving motor 17 whose direction of rotation can be reversed. In addition, the transport device 5 encompasses a bracket 18 having a record hold-down element 21.

Each lifting and lowering device 9 can be moved up and down by way of a motor-driven eccentric control 19. The lifting and lowering device 9 has a bracket 20 for receiving a record holder 4 with a record 1. This bracket 20 supports a record hold-down element 21 oriented with the axis of the record turntable 8 of the playback unit 7 and operating with magnetic force. The bracket 20 is seated to glide on a vertically disposed guide rod 23 by way of a holding mechanism 22. A driving motor 24 secured to the holding mechanism 22 is coupled by way of a worm gear 25 with the eccentric 28 seated on the shaft 26 of the worm gear, which eccentric is supported against a stationary roller 29. The eccentric 28 is designed such that it determines the upper and lower end positions of the lifting and lowering device 9. Two superimposed fork couplers 30 secured to the holding mechanism 22 and cooperating with a stationary web 31 serve to recognize the upper and lower end positions of the lifting and lowering device 9. To determine the exact position of the record holder 4 with the record 1, a sensor 32 is attached to the holding mechanism 22 inside the lifting and lowering device 9. The sensor 32 encompasses a two-armed lever 34 pivotably received in a bearing 33 and whose one arm cooperates, by way of a burl 35 embodied thereupon, with a central nub 36 on the underside of the record holder 4, and whose other, spring-loaded arm cooperates, by way of an angled-off end, with a fork coupler 37 attached to the holding mechanism 22.

The preceding description of the drawings clarifies the construction and use of the record playing device of the invention in its details. It is obvious to a person skilled in the art that the fundamental concept of the present invention can have much broader application, and is not limited to the embodiments viewed in particular here. Thus, it is possible, for example, to provide a plurality of playback units 7 stacked one above the other instead of one of the record magazines 3, by means of which a number of different pieces of music can be performed simultaneously in different rooms. Moreover, a plurality of record playing devices can be operated in connection with a PC computer, the PC computer being provided with corresponding input and output units in the form of an input keyboard, a display and an output printer. With the aid of the information either entered manually by way of an input keyboard or derived electronically from the records, the entire content of the stored records can be determined and processed in the sense of a database system.

We claim:

1. In record playing device including a record magazine that contains record holders with records located in superimposed storage compartments, a record playback unit located adjacent the record magazine and a traveling transport device for conveying a desired record with the record holder back and forth between a selected storage compartment and the playback unit, said device further comprising:

a lifting and lowering device disposed above the playback unit and including:
  a vertically extending guide rod;
  holding mechanism being seated to glide on the guide rod;
  a bracket fixed to the holding mechanism and comprising a record hold-down element for receiving a record holder with a record; and
  a motor-driven eccentric control coupled to the holding mechanism for lowering and lifting the holding mechanism together with the bracket along guide rod.

2. The record playing device as defined claim 1, wherein the motor driven eccentric control further comprises a worm wheel having a shaft rotatably mounted on the holding mechanism; a stationary roller, an eccentric seated on the shaft of the worm wheel and supported against the stationary roller; a driving motor secured to the holding mechanism and a worm gear coupling the driving motor to the worm wheel for rotating the eccentric to thereby determine upper and lower end positions of said lifting and lowering device.

3. A record playing device as defined in claims 1, further comprising two superimposed fork couplers secured to said holding mechanism; and a correspondingly stationarily disposed web cooperating with said fork couplers for recognizing the upper and lower end positions of the lifting and lowering device.

4. The record playing device as defined in claim 1, wherein the record playback unit includes a record turntable and said record playing device further comprises a sensor secured to said holding mechanism for monitoring an exact orientation of a record stored in a record holder with respect to the record turntable of the playback unit.

5. The record playing device as defined in claim 1, wherein during a downward movement beyond the playback unit into its end position, the lifting and lowering device places a record onto the record turntable of the playback unit and the record hold-down element is stationarily disposed on the lifting and lowering device for clamping the record with the record turntable.

6. The record playing device as defined in claim 1, wherein said record magazine comprises two record magazines disposed opposite one another; said record playback unit comprises a plurality of record playback units each located in a vertical axis of one of the record magazines, the transport device conveying a desired record with the record holder back and forth between a selected storage compartment and a selected one of the playback units; and said lifting and lowering device comprises a plurality of lifting and lowering devices each being disposed above a respective one of the record playback units.

* * * * *